Oct. 25, 1955  L. A. MEDLAR  2,721,993
SIGNAL MEANS FOR BATTERY CHARGERS
Filed Nov. 25, 1952
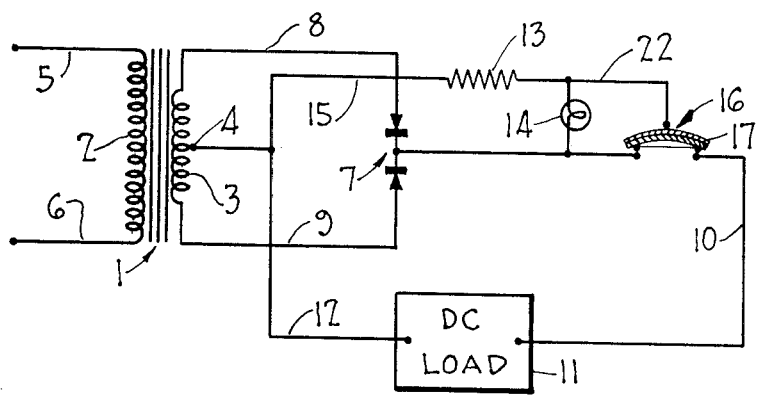
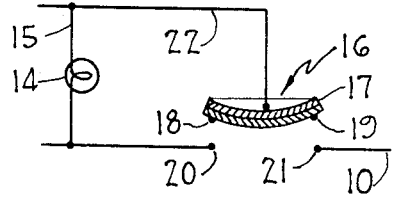
INVENTOR:
LEWIS A. MEDLAR
BY
Stone, Boyden + Mack
ATTY'S

United States Patent Office 2,721,993
Patented Oct. 25, 1955

2,721,993

SIGNAL MEANS FOR BATTERY CHARGERS

Lewis A. Medlar, Oreland, Pa., assignor to Fox Products Company, Philadelphia, Pa., a corporation of Pennsylvania Application November 25, 1952, Serial No. 322,475

4 Claims. (Cl. 340—249)

This invention relates to rectifier circuits with overload protective means, and particularly to such circuits embodying an improved trouble indicator responsive to operation of the protective means.

While generally applicable to rectifier circuits in which the protective means must be located in the output or direct current portion of the circuit, the invention is particularly useful in battery chargers. In such devices, the voltage across the circuit breaker or other protective means is a relatively low direct current voltage varying over a rather wide range. For example, in a typical charger for charging both 6-volt and 12-volt batteries, the voltage across a circuit breaker in the output or charging circuit may vary from about 2 volts to as much as 20 or 30 volts. The lower limit occurs when the charger is connected to a 6-volt battery with proper polarity and is energized; the higher limit occurs when the charger is connected to a 12-volt battery with reverse polarity and is energized. While this voltage variation is not so great in a single voltage battery charger as in a multi-voltage battery charger, it is still considerable, and the invention is therefore particularly useful in both types of chargers.

One object of the present invention is to provide, in a rectifier circuit having protective means in the output portion of the circuit, means such as a trouble indicator responsive to operation of the protective means but energized directly from the output of the rectifier and thus independent of all voltage variations except the rectifier output voltage.

For purposes of economy, it is highly desirable to use in such devices a standard incandescent lamp as a trouble indicator. However, since the energizing current available in the output circuit is direct current at relatively low, but rather widely varying, voltages, the conventional trouble light circuits are obviously impractical.

Accordingly, another object of the present invention is to provide, in a rectifier circuit having a thermal circuit breaker or like protective means in the direct current output circuit, an improved trouble indicator employing a conventional incandescent lamp as the indicating means.

Another object of the invention is to provide such a device particularly applicable to the dual-voltage battery chargers and wherein the trouble indicator responds directly to operation of the protective means in the direct current circuit and is independent of the size of battery being charged and of the polarity of the battery.

In order that these and other objects of the invention may be understood in detail, reference is had to the accompanying drawings which form a part of this specification and wherein:

Fig. 1 is a schematic diagram of a general purpose rectifier circuit embodying the invention;

Fig. 2 is a detail diagram of a portion of the circuit of Fig. 1, enlarged for clarity, and Fig. 3 is a schematic diagram of a dual voltage battery charger embodying the invention.

Referring now to the drawings in detail, and first to Fig. 1 thereof, it will be seen that the embodiment there illustrated comprises a transformer 1 including a primary winding 2 and a secondary winding 3 center-tapped at 4. The primary 2 is provided with power leads 5 and 6 for connection to a suitable source of alternating current. A center-tapped rectifier 7 is connected across the end terminals of the secondary 3 by conductors 8 and 9. The direct current or output circuit comprises a conductor 10 connecting the center-tap of the rectifier 7 to one terminal of the direct current load 11, and a conductor 12 connecting the other terminal of the load to the center-tap 4 of the secondary 3.

The protective means employed consists of a thermal circuit breaker 16 comprising a bimetallic disc 17 carrying diametrically spaced contacts 18 and 19, Fig. 2, cooperating with matching contacts 20 and 21 connected in the output circuit in series with the load. The circuit breaker 16 is so designed that at normal temperatures, occasioned by normal circuit conditions, the disc 17 is downwardly dished, so that contact sets 18, 20 and 19, 21 are closed, and the output circuit is completed through the disc 17. Under overload conditions, as would result from a short in the load, the temperature of the disc 17 exceeds its normal range and, by reason of the bimetallic construction of the disc, the disc snaps to the oppositely dished position seen in Fig. 2, so that the contacts of the circuit breaker are opened and the output circuit thus interrupted. It will thus be seen that the circuit breaker 16 is of the "double break" type, that is, it functions, in response to abnormal conditions, to open two spaced sets of contacts and thus completely isolate from the circuit a conductive element which electrically bridges those two sets of contacts under normal conditions. While a simple bi-metallic disc type thermal circuit breaker has been shown, it will be obvious that any type of circuit breaker may be employed incorporating a conductive member which normally completes the output circuit but is completely isolated from the output circuit when the breaker opens in response to abnormal conditions. Thus, various conventional thermal, electromagnetic, or thermal and electromagnetic circuit breakers may be used, so long as the "double break" operation is provided.

A resistance 13 and an electro-responsive device 14 are connected in series across the output circuit by a conductor 15, as shown, the series combination of elements 13 and 14 being in parallel with the series combination of the load and the circuit breaker. While the element 14 may be any suitable electro-responsive device such as a relay, bell, or the like, I prefer to employ a conventional incandescent lamp.

A conductor 22 connects the bimetallic element 17 electrically to the junction between the resistance 13 and the lamp 14. Thus, when the circuit breaker is closed, as seen in Fig. 1, the lamp is short-circuited and therefore not energized by current from the rectifier 7, since the resistance of the conductor 22 and the closed circuit breaker 16 is negligible as compared to the resistance of the lamp. But, when the circuit breaker is open, as seen in Fig. 2, the short circuit via conductor 22 no longer exists, and the series combination of resistance 13 and lamp 14 is directly across the output of the rectifier. The characteristics of the resistance 13 and lamp 14 are so chosen that the lamp 15 will operate at the voltage provided by the rectifier and thus give prompt indication that the circuit breaker has opened.

The resistance 13 prevents the rectifier output from being short circuited via conductors 15 and 22 when the circuit breaker 16 is closed. The resistance determines the current flow in its portion of the circuit at a value which is adequate to energize the device 14, but is sufficiently low as to amount to only a negligible drain on the rectifier output during normal operation. The actual value of the resistance 13 in any particular case of course depends upon the current requirements of the device 14 and the output voltage of the rectifier circuit.

When the circuit breaker 16 is open, the series combination of the resistance 13 and lamp 14 is of course connected directly across the output of the rectifier 7 and is isolated from the load. Accordingly, the lamp responds only to a single voltage, namely, the output voltage of the rectifier.

Fig. 3 illustrates the invention as applied to a battery charge designed to charge both 6-volt and 12-volt storage batteries. This embodiment comprises a transformer 31 including a primary winding 32 and a secondary winding 33 center-tapped at 34. Power leads 35 and 36 are provided to connect the primary to a suitable source of alternating current. In this embodiment, a bridge type rectifier is employed, the input terminals of the rectifier being connected across the end terminals of the secondary 33 by conductors 38 and 39. One output terminal 40 of the rectifier 37 is connected by a conductor 41 to one terminal of the battery 42 to be charged. The remaining terminal of the battery 42 is connected by a conductor 43 to a manual switch 44, thence either via 43ª to the remaining output terminal of the rectifier 37, or via 43ᵇ to the center-tap 34 of secondary 33, depending upon the position of the switch 44. Thus, when the switch 44 is thrown to the right, as seen in the drawing, the battery is connected across both output terminals of the rectifier 37 for high voltage operation, while when the switch 44 is thrown to the left, the battery is connected across one output terminal of the rectifier and the center-tap 34, so that the rectifier is reduced to a simple center-tapped rectifier for low voltage operation. In the present case, the rectifier is designed to deliver 12 volts at full bridge connection, and 6 volts when used as a center-tapped rectifier.

A thermal circuit breaker 46, in all respects like the circuit breaker 16, Figs. 1 and 2, is connected in the conductor 41 in series with the battery 42, and rectifier 37. A resistance 47 and lamp 48 are connected in series across the output terminals 40 and 45 of the rectifier 37 by conductor 49, so that the resistance and lamp in series are in parallel with the series combination of the battery 42 and circuit breaker 46 when the switch 44 is thrown to the right to connect the rectifier for full voltage operation. The bimetallic element of the circuit breaker 46 is electrically connected to the junction between the resistance 47 and the lamp 48 by conductor 50. Thus, the lamp 48 is normally short circuited, so as not to receive actuating current from the rectifier when the circuit breaker is closed. But, upon opening of the circuit breaker in response to an overload condition, as when the battery 42 is connected with reverse polarity by mistake, the full output voltage of the rectifier is then applied across the series combination of the resistance 47 and lamp 48, so that the lamp is energized to indicate the overload condition.

It will be noted that in this embodiment the full output voltage of the rectifier appears across the resistance and lamp in series, even though the switch 44 should be thrown to the left for 6-volt charging. Conversely, the resistance 47 and lamp 48 may be connected in series across the 6-volt output of the rectifier, as indicated by dotted line 49ª, so that only the lower output voltage of the rectifier appears across the series combination of lamp and resistance, regardless of the position of the switch 44. Of course, the values of the resistance and lamp must be so chosen that the lamp operates at the applied voltage, and these values are dependent upon whether the resistance and lamp are connected across the full bridge rectifier, or across the output of one half of the rectifier operating as a center-tap rectifier. In either case, the trouble light circuit receives only the rectifier output and is entirely independent of the position of the selector switch 44 or the polarity with which the battery 42 is connected.

The circuit breaker 46 should be situated in the conductor 41, rather than in the conductor 43, since the corresponding connections for the conductors 49 and 50 would, for this latter position of the breaker, be such as to subject the lamp 48 to a varying voltage depending upon the position of switch 44.

As shown by the dotted line portion of Fig. 3, the lamp 48 may be replaced by the actuating coil 48′ of a control relay 51 employed to control any suitable device. Here, I have shown the contacts of the control relay 51 connected in series with an incandescent lamp 52, the series combination of contacts and lamp being connected across the input conductors 35 and 36 as shown. Thus, when the circuit breaker 46 opens, the actuating coil 48′ is energized to complete or interrupt the circuit for the lamp 52, depending on whether relay 51 is of the normally open or normally closed type. Such an arrangement is advantageous in that it makes possible the use of a brighter indicating lamp than is the case with lamp 48.

While the electro-responsive devices 14, 48 and 48′ have been shown as preferred circuit elements, it will be understood that any other suitable electro-responsive element may be substituted therefor without departing from the scope of the invention.

I claim:

1. In an electrical system of the type described, the combination of a rectifier, an output circuit connected to said rectifier to supply direct current from the rectifier to a load device, a resistance, an electro-responsive device, a circuit connecting said resistance and electro-responsive device across the output of said rectifier in series, a thermal circuit breaker including a bimetallic element and two spaced contact sets by which said bimetallic element is connected in said output circuit in series with said rectifier and the load whenever the temperature of said element is within a normal range, excessive temperature causing said bimetallic element to distort, opening both of said contact sets and so disconnecting the load from said rectifier and isolating said bimetallic element from said output circuit, and means electrically connecting said bimetallic element and the junction between said resistance and electro-responsive device, whereby said electro-responsive device is short circuited whenever said circuit breaker is closed and receives actuating current from said rectifier only when said circuit breaker is open.

2. In a dual vloltage battery charger, the combination of a transformer including a primary and a center-tapped secondary, a bridge type rectifier, circuit means connecting the input terminals of said rectifier across the end terminals of said secondary, output circuit means including a manual switch for connecting the battery to be charged either across the output terminals of said rectifier for high voltage operation or across the center-tap of said secondary and one output terminal of said rectifier for low voltage operation, a thermal circuit breaker including a bimetallic element and two spaced contact sets by which said bimetallic element is connected in said output circuit means in series with said rectifier and the battery whenever the temperature of said element is within a normal range, excessive temperature causing said bimetallic element to distort, opening both of said contact sets and so disconnecting the battery from said rectifier and isolating said bimetallic element from said output circuit means, a resistance, an electro-responsive signal device, circuit means connecting said resistance and signal device in series across the output terminals of said rectifier, in parallel with the series combination of the battery and said circuit breaker when said output circuit means is connected for full voltage operation, and means electrically connecting said bimetallic element and the junction between said resistance and signal device, whereby said signal device is short circuited whenever said circuit breaker is closed and receives actuating current from said rectifier only when said circuit breaker is open.

3. In a dual voltage battery charger, the combination of a transformer including a primary and a center-tapped secondary, a bridge type rectifier, circuit means connecting the input terminals of said rectifier across the end terminals of said secondary, output circuit means including a manual switch for connecting the battery to be charged either across the output terminals of said rectifier for high voltage operation or across the center-tap of said secondary and one output terminal of said rectifier for low voltage operation, a thermal circuit breaker including a bimetallic element and two spaced contact sets by which said bimetallic element is connected in said output circuit means in series with said rectifier and the battery whenever the temperature of said element is within a normal range, excessive temperature causing said bimetallic element to distort, opening both of said contact sets and so disconnecting the battery from said rectifier and isolating said bimetallic element from said output circuit means, a resistance, an electro-responsive signal device, circuit means connecting said resistance and signal device in series across the center-tap of said secondary and one terminal of said rectifier, in parallel with the series combination of the battery and said circuit breaker when said output circuit means is connected for low voltage operation, and means electrically connecting said bimetallic element and the junction between said resistance and signal device, whereby said signal device is short circuited whenever said circuit breaker is closed and receives actuating current from said rectifier only when said circuit breaker is open.

4. In a dual voltage battery charger, the combination of a transformer including a primary adapted to be connected to a source of alternating current and a tapped secondary, a load, a circuit breaker, a rectifier having at least two sections, switch means and circuits connecting said rectifier to said secondary and the series combination of said circuit breaker and said load in such manner that in one position of said switch means the load is connected in series with only one of said rectifier sections and in the other position the load is connected in series with both of said sections, said rectifier sections being so connected to the switch means and the transformer that one voltage is supplied to the load when said switch means is in said one position and a higher voltage is supplied to the load when said switch means is in said other position, a resistance, an electro-responsive device, a circuit connecting said electro-responsive device and said resistance in series across at least one section of said rectifier, and a connection controlled by said circuit breaker to short circuit said electro-responsive device only when said circuit breaker is closed, whereby actuating current is supplied to said electro-responsive device only when said circuit breaker is open.

References Cited in the file of this patent

UNITED STATES PATENTS

| | | |
|---|---|---|
| 2,366,505 | Fletcher | Jan. 2, 1945 |
| 2,571,048 | Medlar | Oct. 9, 1951 |
| 2,637,843 | Kammerdiener | May 5, 1953 |